C. BATEHOLTS.
STEERING WHEEL.
APPLICATION FILED OCT. 12, 1914.
1,212,169.
Patented Jan. 16, 1917.
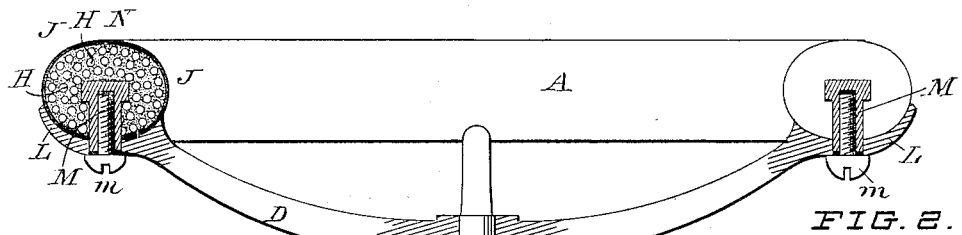
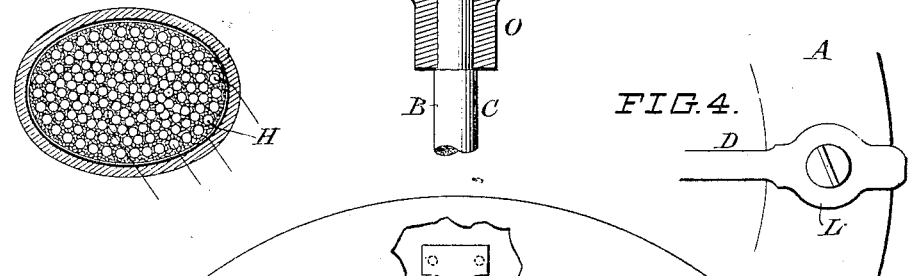
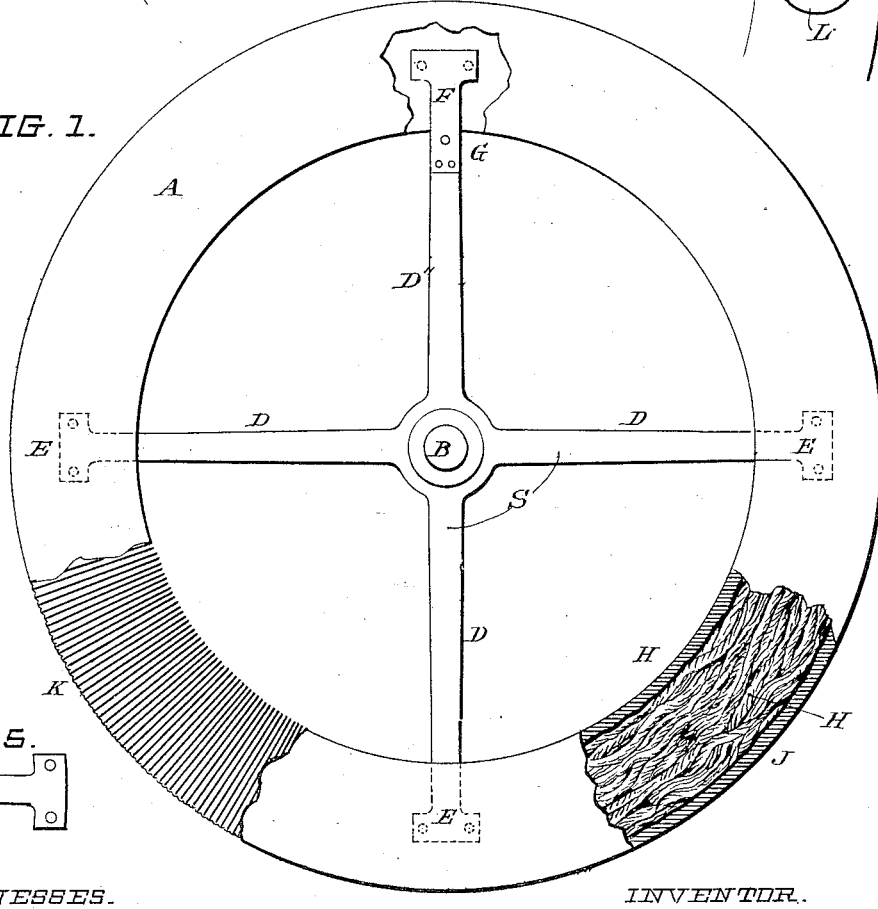
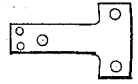
WITNESSES.
Geo. F. Houghton.
William C. Colwin.
INVENTOR.
CLINTON BATEHOLTS.
BY Franklin Scott ATTORNEY.

UNITED STATES PATENT OFFICE.

CLINTON BATEHOLTS, OF HOOSICK FALLS, NEW YORK, ASSIGNOR TO SPECIALTY INSULATION MANUFACTURING COMPANY, OF HOOSICK FALLS, NEW YORK.

STEERING-WHEEL.

1,212,169.  Specification of Letters Patent.  Patented Jan. 16, 1917.

Application filed October 12, 1914. Serial No. 866,208.

*To all whom it may concern:*

Be it known that I, CLINTON BATEHOLTS, a citizen of the United States, residing at the village of Hoosick Falls, in the county of Rensselaer and State of New York, have invented certain new and useful Improvements in Steering-Wheels for use on Automobiles, which invention is also applicable to any kind of a rotary hand-wheel, such, for instance, as the hand-wheels used on brakes for railway-cars and many others.

Hand wheels of the character mentioned have commonly been made of metal, but for many uses and under many conditions metal is objectionable. One of the most serious objections is that a hand wheel in which the rim is made, for instance of iron, steel or brass, in freezing weather gathers and holds frost, and on that account is both inconvenient and disagreeable to handle. In steering an automobile the grip of the hand on the rim of the wheel is practically constant, and when this is the case the hand will become numb and insensible and incapable of maintaining a firm grip. Hence the tendency to frost-bite becomes irresistible causing the operator to relax his grip on the rim of the wheel to protect his hands. To overcome such objectionable features resort to wood, leather and other coverings for the rim has been had to secure a rim which would not chill the hands, but all such expedients are inferior to a solid rim upon which the hands of the driver can take a firm hold in direct contact. It has been settled that hard rubber is unsuitable for these steering wheels for the reason that it is too rigid or non-elastic and on account of its brittleness does not withstand sudden shocks without breaking. It is also too cold to handle comfortably.

This invention consists of a specially constructed rim mounted or attached to a metallic spider which is carried in the ordinary way on the upper end of a steering shaft. It is fully illustrated in the drawings wherein—

Figure 1 shows a plan of a steering wheel with parts of its rim broken away to disclose its structure. Fig. 2 shows a diametral section of the wheel taken on the plane of the axis of the steering shaft, and exhibits one mode of attaching the rim of the wheel to the spider. Fig. 3 is a radial section through the rim showing its material and structure. Fig. 4 is a plan view of a part of the rim of the wheel showing one of the rim supports. Fig. 5 is a plan view of a T-shaped coupling by which the rim may be fastened to the extremities of the spider arms.

The two principal elements of the invention are the spider and its rim. The steering shaft is shown at B and the spider at S. The spider consists of a hub C from which project radially a plurality of arms D, D, D, D''. The extremities of the arms have provisions for taking on the rim A. The rim consists of an annular core composed of (preferably) strands of fiber H, H, or a moderately soft string or cord, which may be wound and shaped on or in the groove of a pulley so as to take on the form of a rope. In performing this winding, the cord first passes through a trough of some plastic material which has the property of hardening and still will leave the ring somewhat elastic and irrefrangible so that it can resist blows and shocks without fracture. After the coil has attained a proper size it is removed from the form on which it was wound and is placed between molds and subjected to high pressure in a suitable press the effect of which is to compact and solidify the fiber and plastic substance in which it is involved so that all interstices between the strands will be filled. After this interstitial filling has fairly set, the ring is coated with a plastic covering which is laid on in strips to an approximately even thickness or sufficient to bring the exterior dimensions of the rim to the proper size to carry out the next step in the production of the finished article, which consists in subjecting the rim so covered to compression between molds which impart to it its external form and finish. As it is desirable that the surface of the rim should be roughened, pebbled or corrugated to afford means for obtaining a firmer handgrip, Fig. 1 shows at K a section which is transversely corrugated with fine ribs as one style of rough finish for this purpose.

The rim may be attached to the spider in various ways. One mode is shown in Fig. 2. It consists in embedding tubular flanged nuts M, M, in the material of the core H, in positions to coincide with the ends of the spider arms D, D. The extremity of each arm D, is wrought into the form of a concave concentric seat to receive the under side of the rim as seen in Figs. 2 and 4, and is perforated for the passage of a screw m. This screw, when the parts are assembled passes through the rim-seat L and enters and is screwed into the flanged nut M, thus binding the rim to the spider. Another plan is shown in Fig. 1, in which flat perforated T-shaped plates are embedded in the body of the core so that the stems of these plates project toward the center of the rim and are fitted to have the ends of the arms attached to them in any substantial way. Or, the extremities of the spider arms may be so designed that the body of the rim-core can be built up around them as shown at E, E, Fig. 1.

I therefore claim as my invention and desire to protect by Letters Patent, the following:—

1. A steering wheel consisting of a spider and a rim mounted thereon, said rim comprising an annular core composed of fibrous material wound or laid up in a condensed plastic substance and covered with one or more layers of plastic material which is a non-conductor of electricity and a poor conductor of heat, substantially as specified.

2. A core for a steering wheel rim consisting of a coil of fibrous twine or cord having the interstices between its fibers and strands filled with a plastic substance, and externally shaped and hardened, substantially as specified.

3. A core for a steering wheel rim consisting of a coil of fibrous twine or cord having the interstices between the fibers and strands filled with a plastic substance, and externally shaped and hardened, the whole being covered with one or more layers of an elastic, infrangible, plastic material which is a non-conductor of electricity and a poor conductor of heat, having a roughened non-slippable surface, substantially as specified.

4. A steering wheel consisting of a spider and a rim mounted thereon, said rim comprising an annular core composed of fibrous material wound or laid up in a plastic condensed substance and covered with one or more layers of plastic material which is a poor conductor of heat substantially as specified.

5. A steering wheel rim having a core consisting of a coil of fibrous twine or cord having the interstices between its strands and fibers filled with a condensed plastic substance and externally molded and condensed, the whole being covered with one or more layers of an elastic, infrangible, plastic material which is a poor conductor of heat, and molded under pressure with a roughened non-slippable surface to aid the hand grip, substantially as specified.

In witness whereof I have hereunto subscribed my name this 21 day of September, A. D., 1914.

CLINTON BATEHOLTS.

Witnesses:
FRANKLIN SCOTT,
EMILY SCOTT.